UNITED STATES PATENT OFFICE.

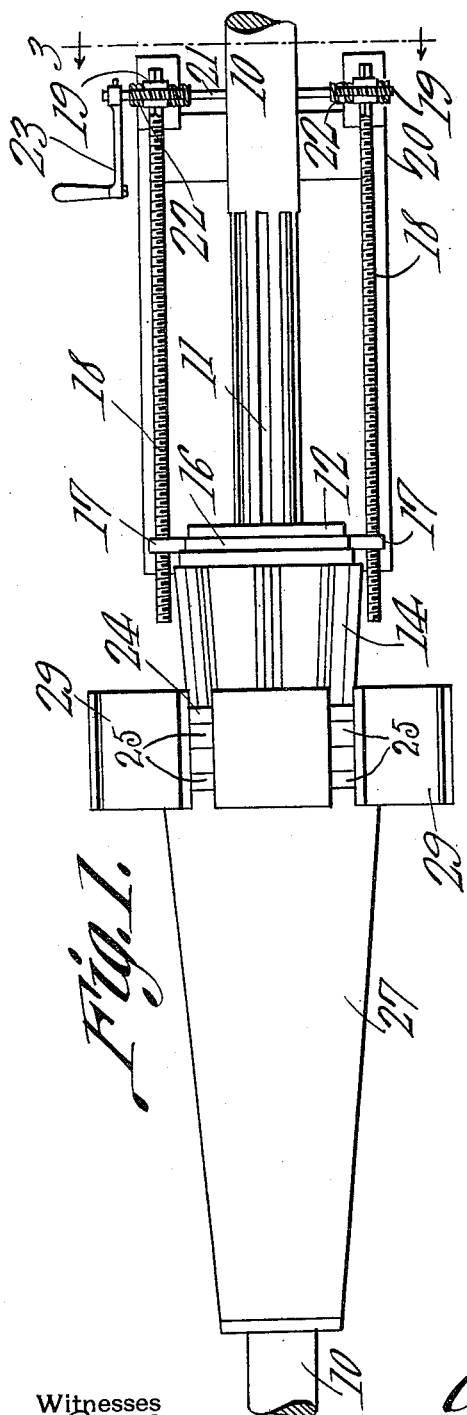

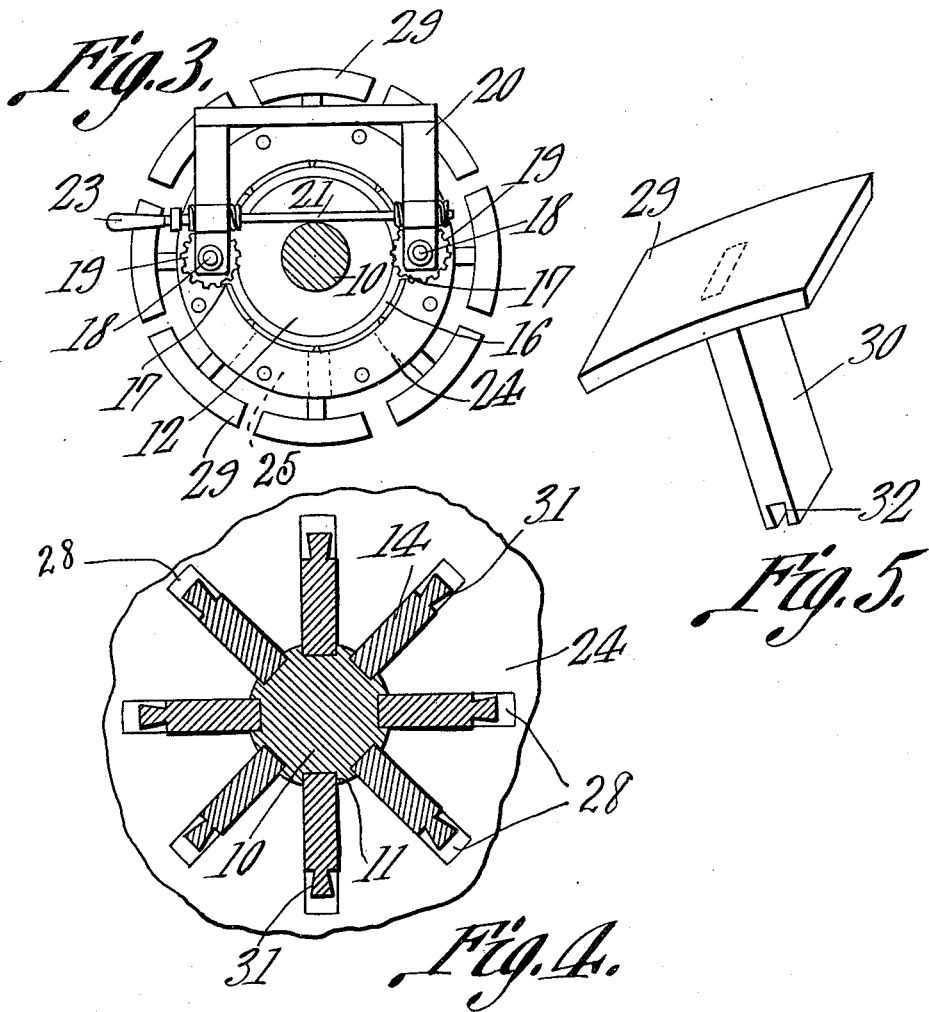

CLINTON HUDNELL CALDWELL, OF ROLFE, PENNSYLVANIA.

EXPANSIBLE PULLEY.

1,012,983.　　　　　Specification of Letters Patent.　　Patented Dec. 26, 1911.

Application filed February 24, 1911.　Serial No. 610,489.

*To all whom it may concern:*

Be it known that I, CLINTON H. CALDWELL, a citizen of the United States, residing at Rolfe, in the county of Elk and State of Pennsylvania, have invented a new and useful Expansible Pulley, of which the following is a specification.

It is the object of the present invention to provide an improved expansible pulley of that type which may be expanded while in motion.

One aim of the invention is to so construct the pulley that its rim sections or segments will be all expanded to the same degree and will not be liable to become disarranged under high speed conditions.

In the accompanying drawings:—Figure 1 is a plan view of the pulley embodying the present invention. Fig. 2 is a vertical longitudinal sectional view therethrough. Fig. 3 is an end view looking in the direction of the arrows of line 3—3 of Fig. 1. Fig. 4 is a similar view on the line 4—4 of Fig. 2. Fig. 5 is a perspective view of one of the rim sections or segments.

In the drawings, the numeral 10 indicates a shaft which is formed with a number of longitudinally-extending grooves 11. These grooves are equidistantly spaced about the shaft 10. A collar 12 is slidably fitted upon the shaft and a collar 13 is also slidably fitted upon the shaft and extending between and connecting the two collars 12 and 13 are expanding wings 14 equal in number to the grooves in the shaft. In fact, the inner edges of the wings 14 fit slidably in the grooves, their outer edges extending at an angle to the axis of the shaft as is clearly shown in Fig. 2 of the drawings. It will be readily understood that the wings radiate from the shaft and by referring to Fig. 2 it will be noted that they decrease in width from the collar 12 to the collar 13. The collar 12 is peripherally grooved as at 15 to rotatably receive a collar 16 having diametrically oppositely located ears 17. These ears 17 are formed with openings the walls of which are threaded, and in these openings are threaded adjusting screw shafts 18. At their ends opposite those threaded through the ears 17, the screw shafts 18 carry worm gears 19 and are journaled in a frame 20 arranged beneath the shaft 10. Journaled transversely in the frame 20 is a shaft 21 which, at suitable points, is formed with a worm 22, meshing with the worm gears 19.

At one end, the shaft 21 is provided with a crank handle 23 whereby it may be manually rotated to impart rotary movement to the screw shafts 18 such movement of the shafts 18 serving, as will be readily understood, to adjust the collars 12 and 13 and the connecting expanding wings 14, longitudinally of the shaft 10. The engagement of the inner edges of the expanding wings 14 in the grooves 11 in the shaft of course holds these wings and the collars 12 and 13 for rotation with the shaft, the frame 20 and the shafts 21 and 18 and their relative parts, supported therein, being relatively fixed.

The hub of the pulley proper consists of flat rings 24 held spaced by suitable blocks 25 arranged at intervals in an annular series between them. A collar 26 is secured upon the shaft 10 and a frusto-conical casing 27 is secured at its minor end to the said collar and at its major end to the adjacent one of the collars 24, the said casing inclosing the grooved portions of the shaft adjacent the collar 26 and also inclosing the greater portion of the expanding wings 14. The casing 27 furthermore serves as a means for holding the pulley against longitudinal movement on the shaft, it being held for rotation with the shaft by reason of the fact that the wings 14 project into notches formed in the inner peripheries of the collars 24, these notches being shown clearly in Fig. 4 of the drawings and indicated by the numeral 28.

The rim sections or segments of the pulley are indicated by the numeral 29 and are equal in number to the expanding wings 14, each section being provided with an arm 30 which is slidably fitted between the collars 24 and the spacing blocks 25. Each expanding wing at its outer edge is dovetailed as at 31 and the inner ends of the arms 30 are grooved as at 32 to slidably receive the said edges of the expanding wings.

From the foregoing it will be readily understood that the belt to be driven is trained about the pulley consisting of the hub and the segments 29 and that the pulley may be expanded or contracted by rotating the crank handle 23 in one direction or the other. It will also be seen that the outer edges of the wings 14 form a surface substantially parallel with the inner surface of the frusto-conical casing 27, and that any movement of the wings 14 into or out of the casing 27, will cause the rim sections 29 to be projected, thus increasing or diminishing the diameter of the pulleys, as desired. The outer surfaces or edges of the wings 14 as clearly shown in Figs. 1 and 2, in outline form a frusto-conical element, rotatable with, but longitudinally slidable upon the shaft 10, the grooves 11 assuring the relative positions of said wings 14.

What is claimed is:—

The combination with a cylindrical shaft provided with a series of radial grooves longitudinally disposed thereon, of an expansible pulley, having a series of tapered wings the inner edges of which are slidably mounted in the grooves of the shaft and the outer edges of which form a frusto-conical member, means for connecting all of said wings for movement in unison, a frusto-conical casing mounted upon the shaft and adapted to have the said wings slidable into and out of said casing, the outer edges of the said wings being parallel with the inner face of the said casing, means for reciprocating the said wings upon the shaft and into and out of said casing, a pair of disks carried by the inner ends of said casing, and provided with a series of radial slots therebetween, an arm mounted in each slot thereof and having its inner end in sliding engagement with a wing, and a pulley rim section carried by each one of said arms, whereby as the said wings are moved in unison into and out of the frusto-conical casing, said pulley sections are projected or retracted to increase or reduce the circumference of the expansible pulley.

In testimony that I claim the foregoing as my own, I have hereto affixed my signature in the presence of two witnesses.

CLINTON HUDNELL CALDWELL.

Witnesses:
TORRENCE CALDWELL,
TORRENCE WORKMAN.

---

Copies of this patent may be obtained for five cents each, by addressing the "Commissioner of Patents, Washington, D. C."